(12) United States Patent
Heaton

(10) Patent No.: US 8,307,564 B1
(45) Date of Patent: Nov. 13, 2012

(54) DECK BUILDING ASSIST TOOL

(76) Inventor: Danny A. Heaton, Watertown, SD (US)

( * ) Notice: Subject to any disclaimer, the term of this patent is extended or adjusted under 35 U.S.C. 154(b) by 162 days.

(21) Appl. No.: 12/876,303

(22) Filed: Sep. 7, 2010

(51) Int. Cl.
*G01B 3/30* (2006.01)
*B43L 7/027* (2006.01)
*B43L 7/033* (2006.01)

(52) U.S. Cl. ............... 33/527; 33/476; 33/481; 33/482; 33/429

(58) Field of Classification Search ............ 33/526, 33/527, 403, 474, 476, 481, 482, 484, 485, 33/429
See application file for complete search history.

(56) References Cited

U.S. PATENT DOCUMENTS

| | | | | |
|---|---|---|---|---|
| 855,987 | A | * | 6/1907 | Schlageter ............ 33/474 |
| 2,655,729 | A | * | 10/1953 | Panske ............... 33/481 |
| 4,257,570 | A | | 3/1981 | Rasmussen |
| 4,404,753 | A | * | 9/1983 | Klok ................ 33/451 |
| 4,573,276 | A | * | 3/1986 | Torczon ............. 33/481 |
| 4,930,225 | A | * | 6/1990 | Phillips ............. 33/526 |
| 4,955,142 | A | * | 9/1990 | Rieck ............... 33/526 |
| 5,159,729 | A | | 11/1992 | Walker |
| 5,396,710 | A | * | 3/1995 | Battaglia ............ 33/429 |
| 5,741,038 | A | | 4/1998 | Fowler |
| 5,871,316 | A | | 2/1999 | Bills |
| 5,933,974 | A | * | 8/1999 | Walters et al. ........ 33/474 |
| 6,145,920 | A | | 11/2000 | Rasmussen |
| 6,210,087 | B1 | | 4/2001 | Bacon |
| 6,243,961 | B1 | * | 6/2001 | Winski .............. 33/526 |
| 6,270,301 | B1 | | 8/2001 | Dunlop |
| 6,494,015 | B1 | * | 12/2002 | Critchlow .......... 52/749.1 |
| 6,578,278 | B2 | * | 6/2003 | Siefert ............. 33/429 |
| 6,622,394 | B2 | * | 9/2003 | Werner et al. ........ 33/474 |
| 6,843,626 | B1 | | 1/2005 | Falconer |
| 6,866,454 | B2 | | 3/2005 | White |
| 7,219,951 | B2 | | 5/2007 | Rasmussen |
| 7,543,388 | B2 | * | 6/2009 | Christensen et al. ..... 33/194 |
| D625,208 | S | * | 10/2010 | Heaton ............. D10/65 |

* cited by examiner

*Primary Examiner* — Christopher Fulton

(57) ABSTRACT

A deck building assist tool includes a panel that has a top side, a bottom side, a first edge, a second edge, and a third edge. A first line is coextensive with the first edge and a second line is coextensive with the second edge. The first and second lines intersect each other and are orientated perpendicular with respect to each other. A spacing plate extends downwardly from the bottom side. A plane of the spacing plate is orientated parallel to the second line and is positionable between adjacent planks to indicate correct spacing between the adjacent planks. The panel has a pair of openings therein. The spacing plate has a front edge directed forward and spaced from the first edge. The front edge is spaced from the first edge to correctly position the openings over a joist.

18 Claims, 8 Drawing Sheets

DECK BUILDING ASSIST TOOL

BACKGROUND OF THE DISCLOSURE

Field of the Disclosure

The disclosure relates to construction tool devices and more particularly pertains to a new construction tool device for assisting a person in determining the correct placement of fasteners and spindles when constructing a dwelling deck-like structure.

SUMMARY OF THE DISCLOSURE

An embodiment of the disclosure meets the needs presented above by generally comprising a panel that has a top side, a bottom side, a first edge, a second edge, and a third edge. A first line is coextensive with the first edge, a second line is coextensive with the second edge, and a third line is coextensive with the third edge. The first and second lines intersect each other and are orientated perpendicular with respect to each other. The third line intersects each of the first and second lines and forms a 45 degree angle with each of the first and second lines. A spacing plate extends downwardly from the bottom side and lies in a plane orientated perpendicular to a plane of the bottom side. The plane of the spacing plate is orientated parallel to the second line and is positionable between adjacent planks to indicate correct spacing between the adjacent planks. The panel has a pair of openings therein extending into the top side and outwardly of the bottom side to indicate correct positioning of fasteners through the plank and into a joist. The spacing plate has a front edge directed forward and spaced from the first edge. The front edge is spaced from the first edge to correctly position the openings over a joist.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
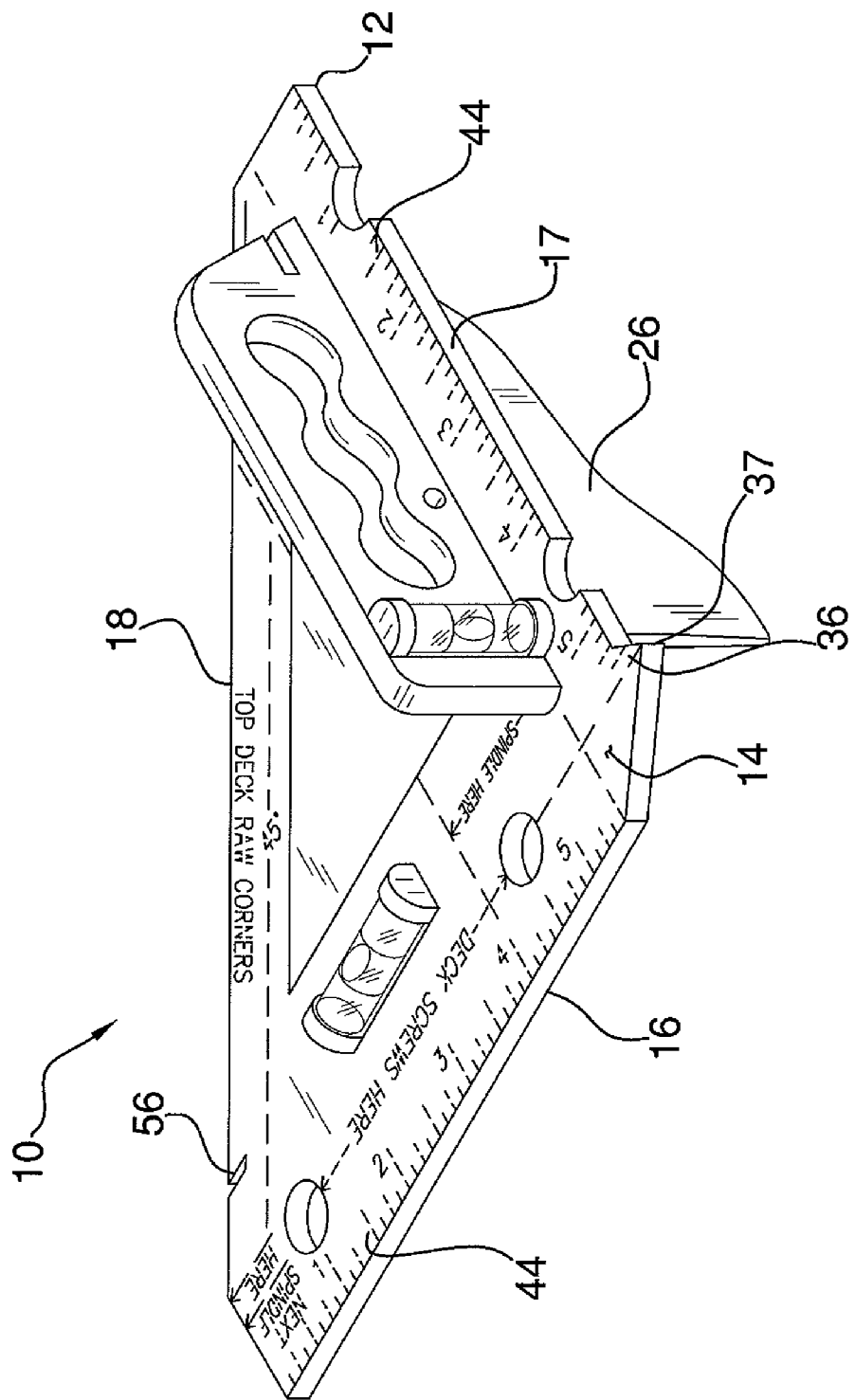
FIG. 1 is a top perspective view of a deck building assist tool according to an embodiment of the disclosure.

With reference now to the drawings, and in particular to FIGS. 1 through 8 thereof, a new construction tool device embodying the principles and concepts of an embodiment of the disclosure and generally designated by the reference numeral 10 will be described.

As best illustrated in FIGS. 1 through 8, the deck building assist tool 10 generally comprises a panel 12 that has a top side 14, a bottom side 15, a first edge 16, a second edge 17, and a third edge 18. A first line 21 is coextensive with the first edge 16, a second line 22 is coextensive with the second edge 17 and a third line 23 is coextensive with the third edge 18. The first 21 and second 22 lines intersect each other and are orientated perpendicular with respect to each other. The third line 23 intersects each of the first 21 and second 22 lines and forms a 45 degree angle with each of the first 21 and second lines 22.

A spacing plate 26 extends downwardly from the bottom side 15. The spacing plate 26 lies in a plane orientated perpendicular to a plane of the bottom side 15. The plane of the spacing plate 26 is orientated parallel to the second line 22 and is positionable between adjacent planks 70 to indicate correct spacing between the adjacent planks 70 of a deck. The spacing plate 26 has a first side 27, a second side 28 and a thickness dimension defined from the first side 27 to the second side 28. The thickness dimension may be from ⅛ inch to 3/16 inch adjacent to the bottom side 15.

Figure 6:
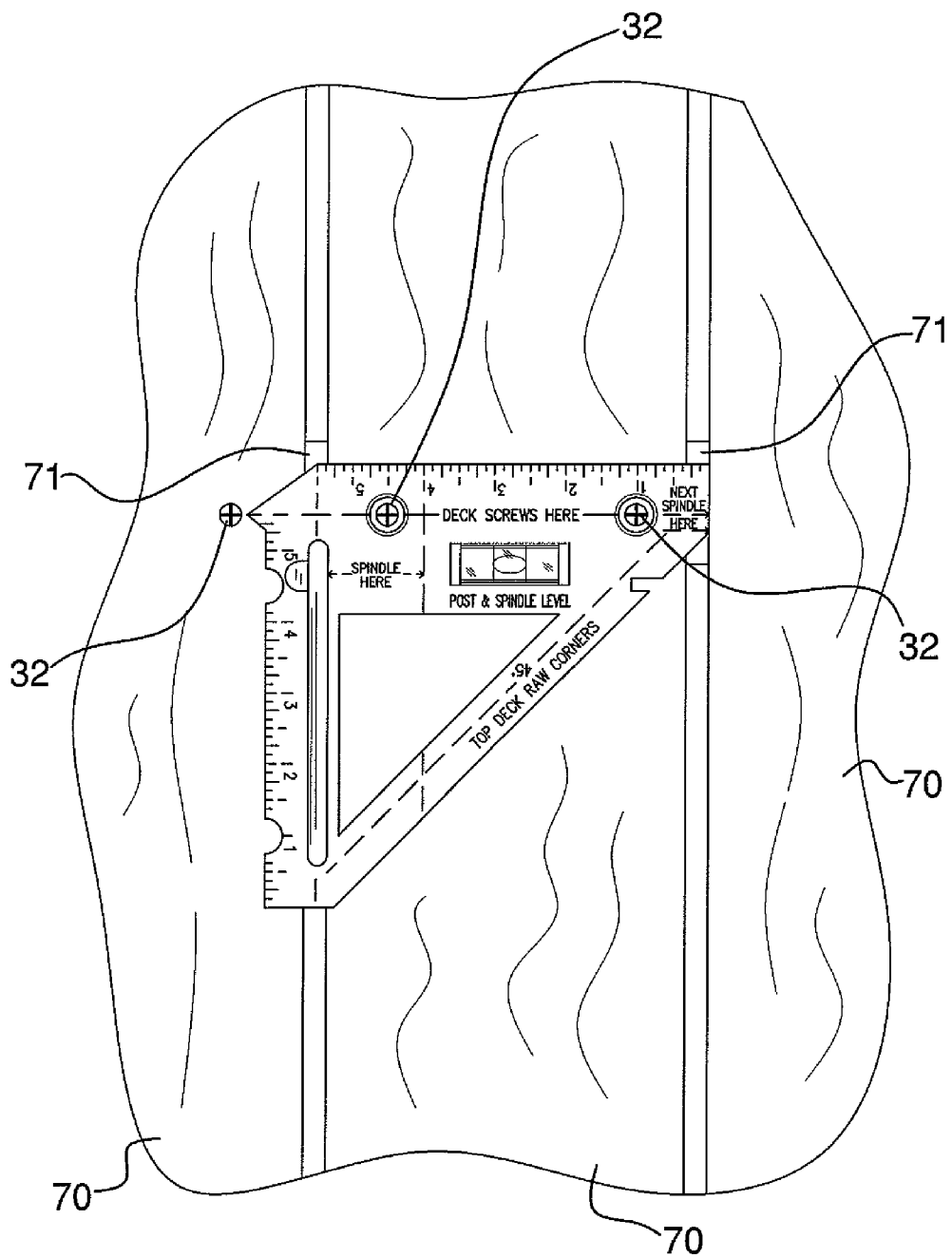
FIG. 6 is a top in-use view of an embodiment of the disclosure.

The panel 12 has a pair of openings 30 therein extending into the top side 14 and outwardly of the bottom side 15 to indicate correct positioning of screws, or fasteners 32 in general, through a plank 70 and into a joist 71. In particular, when the panel 12 is placed upon the plank 70, the openings 30 show where the fasteners 32 are to be positioned. The spacing plate 26 has a front edge 34 directed forward and spaced from the first edge 16. The front edge 34 is spaced from the first edge 16 to correctly position the openings 30 over a joist 71. The front edge 34 may be between 1 inch and 2 inches from the first edge 16. More particularly, the openings 30 are centered on a fourth line 24 that is orientated parallel to the first line 21. The fourth line 24 lies in a plane orientated perpendicular to the top side 14 and which may be spaced from the front edge 34 approximately ¾ inch. When the front edge 34 abuts the joist 71 and the spacing plate 26 is between adjacent planks 70, this places the axes of the openings 30 on a center of a joist 71 having a width of 1½ inches. The axes of the openings 30 may be spaced from each other 3½ inches. A pointer 36 is attached to and extends away from the second edge 17. The fourth line 24 intersects a point 37 of the pointer 36. A distance between the point 37 and the axis of a closer one of the openings 30 may be from 1¾ inches to 2¼ inches. As shown in FIG. 6, this allows a person ensure that the openings 30 are aligned with a fastener 32 in an adjacently positioned plank 71.

The second edge 17 is spaced from the spacing plate 26 to indicate a proper distance between the second edge 17 and a joist 71. The second edge 17 has notches 40 therein to indicate proper placement of fasteners 32. The notches 40 may be spaced from each other 3½ inches and the second edge may be spaced ¾ inch from the spacing plate 26. In more particular usage, the spacing plate 26 may be abutted against an end edge of a plank 70 so that the second edge 17 extends over the plank 70. Typically there is a joist 71 that is flush with the end edge. By positioning the spacing plate 26 against the end edge of the plank 70, the notches 40 will show a person where fasteners 32 can be inserted to engage the joist 71 below the plank 70.

Figure 7:
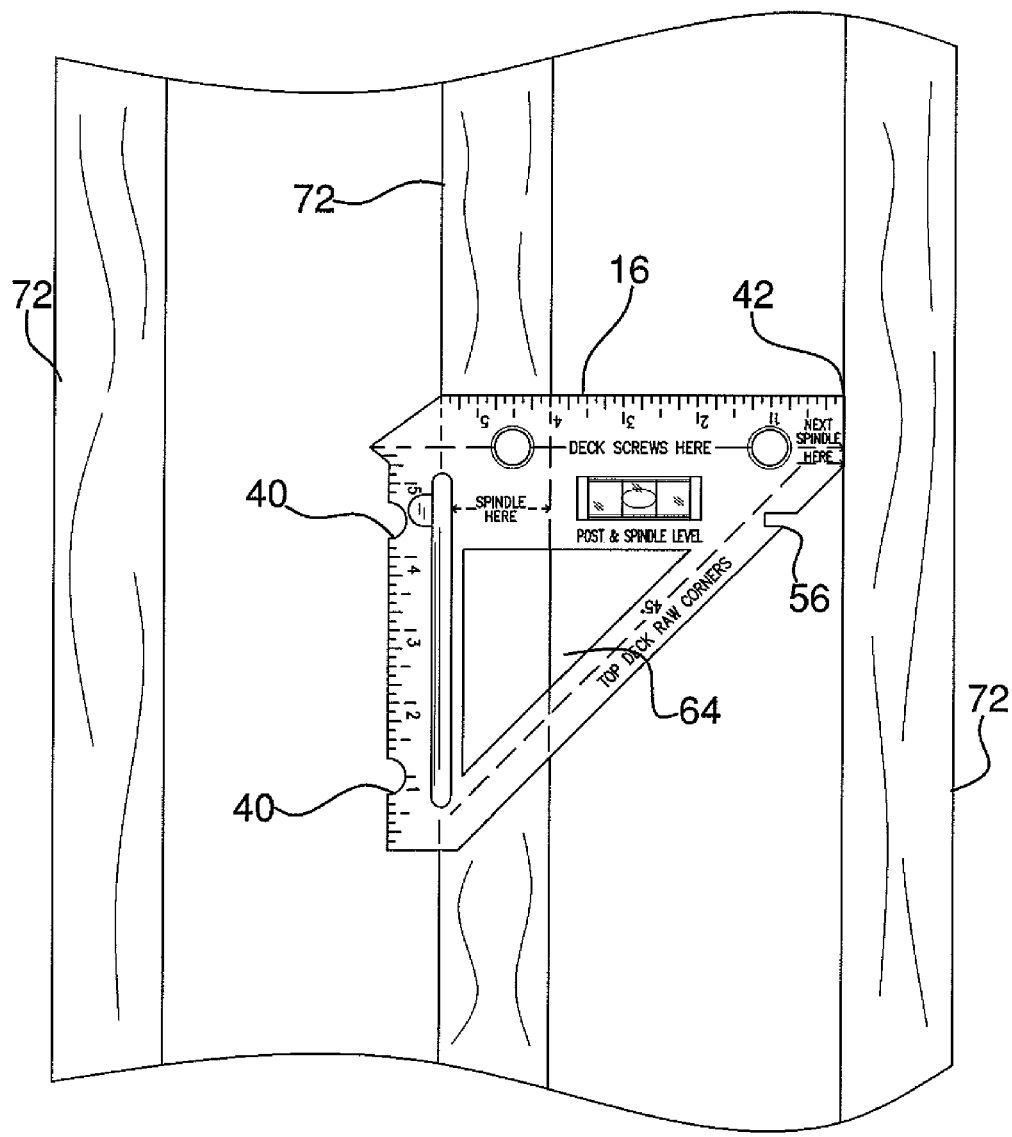
FIG. 7 is a top in-use view of an embodiment of the disclosure with a top side of the tool in a vertical orientation.

The first edge 17 has a length from a plane of the spacing plate 26 to an edge 42 distal to the second edge 17 from 4½ inches to 5½ inches to indicate a proper space between spindles 72. As shown in FIG. 7, the spacing plate 26 is positioned against a spindle 72 and the distal edge 42 of the first edge 16 then indicates where the next spindle 72 is positioned to ensure that all joists are equally spaced from each other. Typically this distance is 4 inches, however, the top side 14 may have measuring indicia 44 thereon along the first 16 and second 17 edges to allow persons to vary the positioning of the planks 70, spindles 72 and fasteners 32 as needed.

Figure 2:
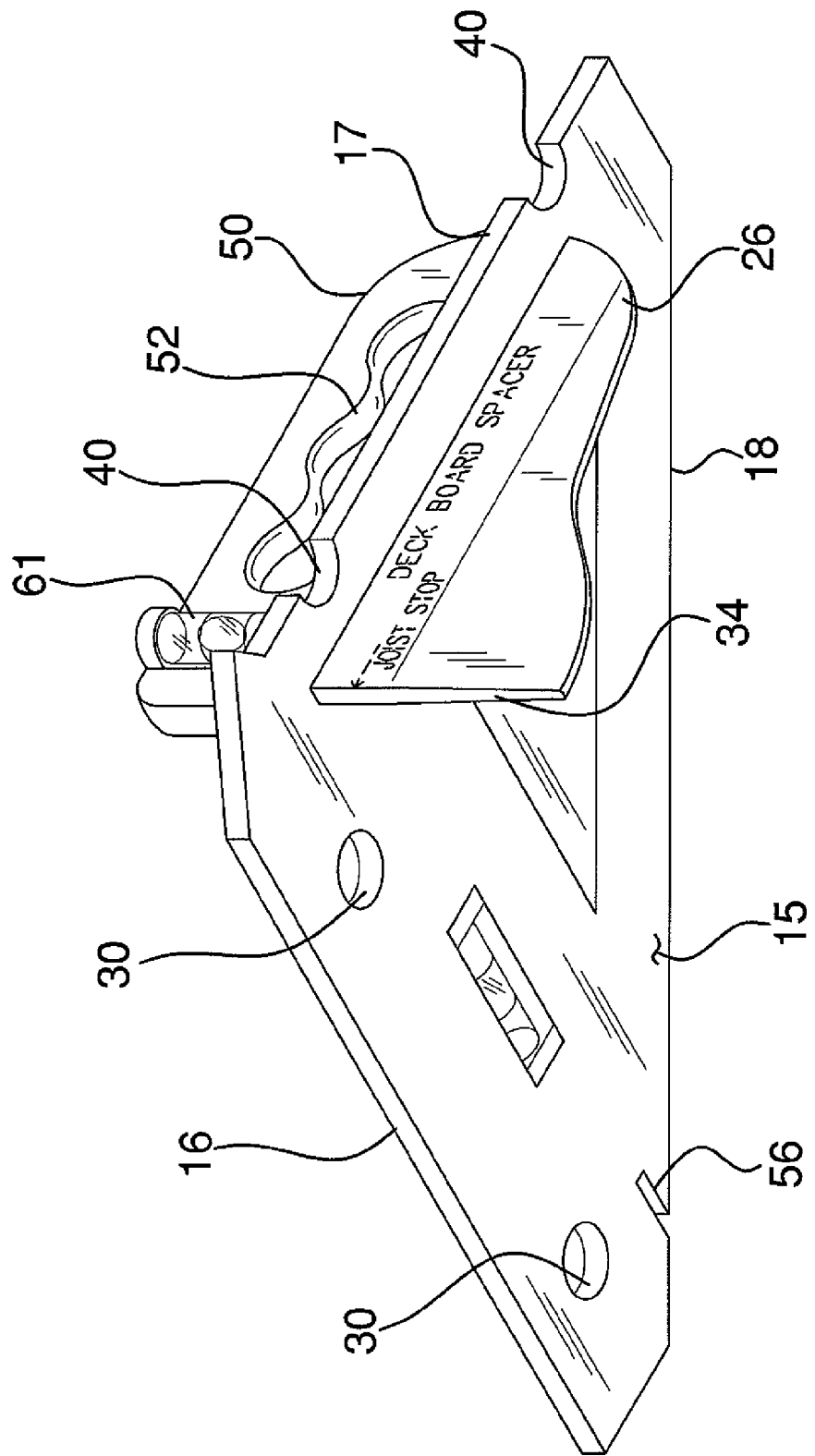
FIG. 2 is a bottom perspective view of an embodiment of the disclosure.
Figure 3:
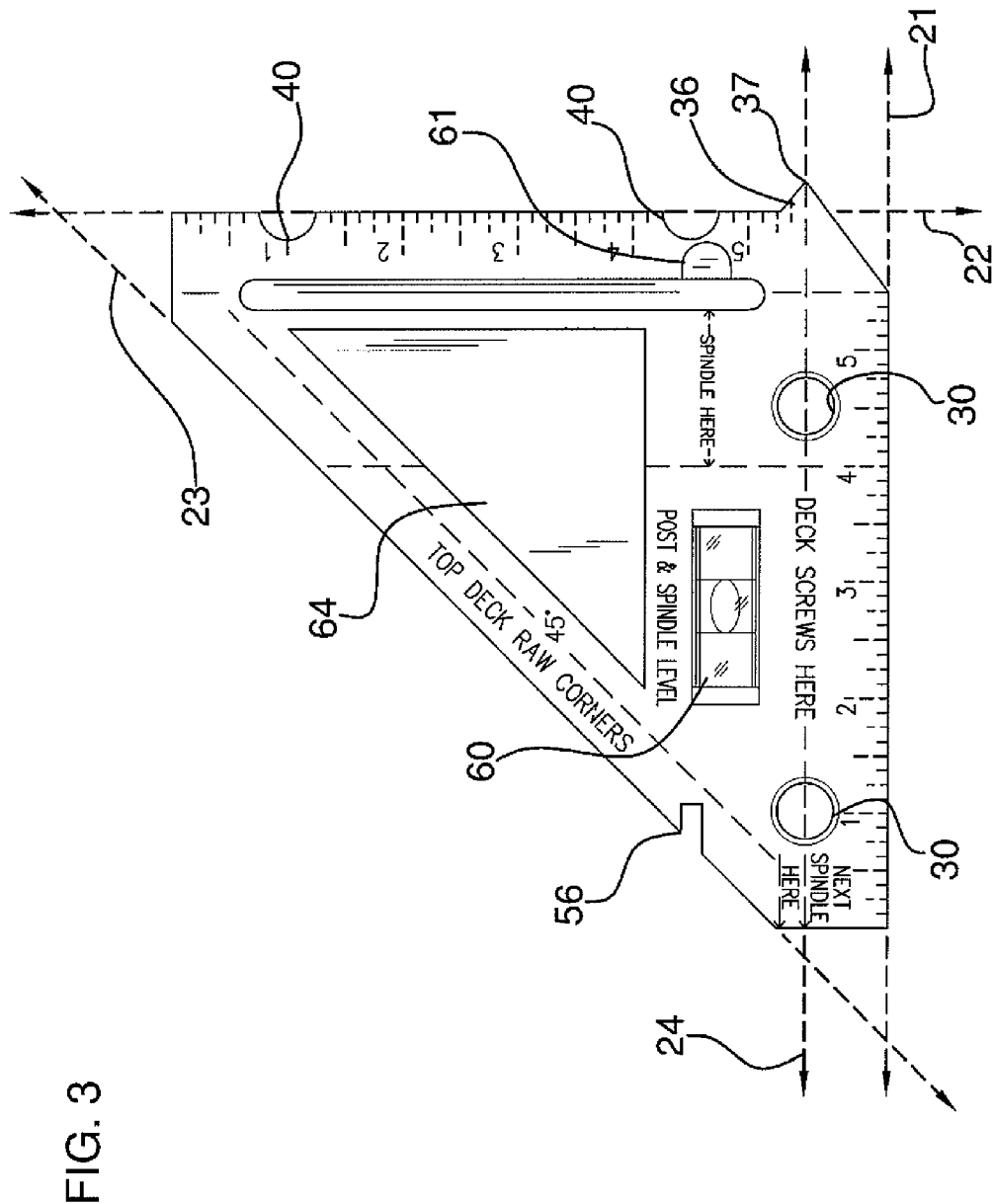
FIG. 3 is a top view of an embodiment of the disclosure.
Figure 4:
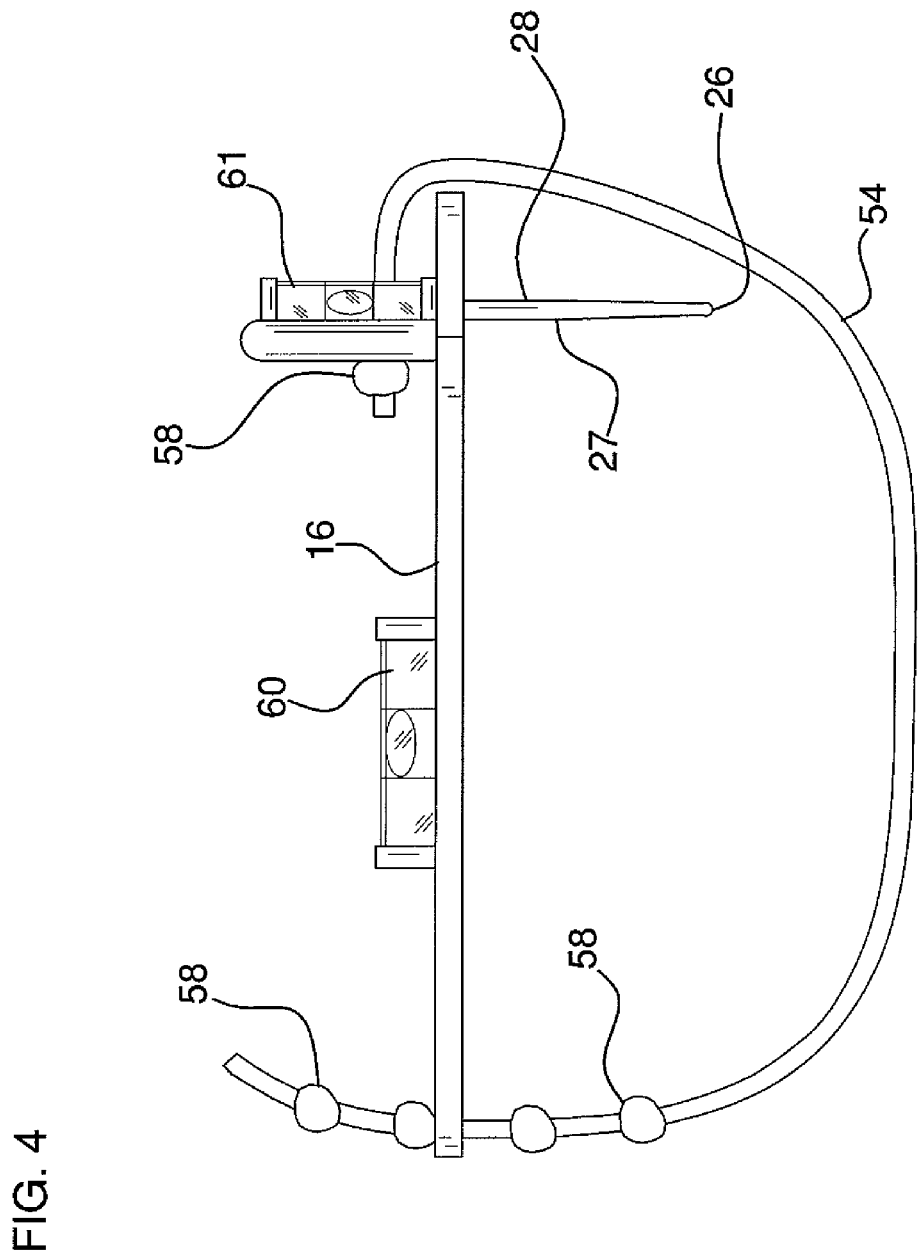
FIG. 4 is an end view of an embodiment of the disclosure.
Figure 5:
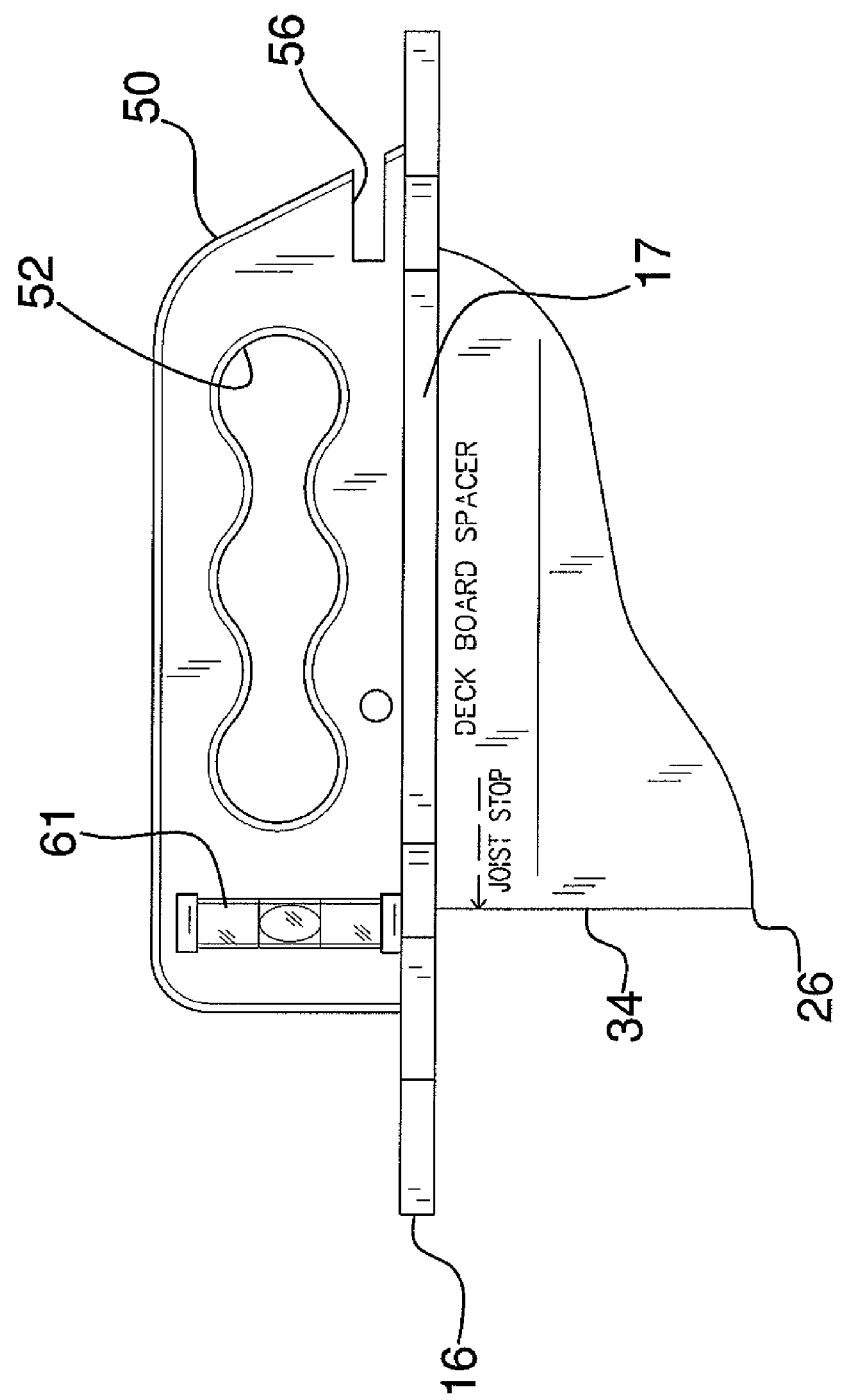
FIG. 5 is a side view of an embodiment of the disclosure.

A handle 50 extends upwardly from the top side 14. The handle 50 has an aperture 51 extending therethrough. The handle 50 may be a single piece joined together with the spacing plate 26 so that together they extend through the panel 12. This may be useful for pulling the spacing plate 26 upwardly through the panel 12 should it become lodged between two plank 70 sections. The spacing plate 26 may be tapered, as shown in FIG. 2, as it extends away from the panel 12 to assist in its removal from a space between adjacent planks 70. A tether 54, as shown in FIG. 4, may be used for hands-free positioning, particularly on spindles 72. In use, the bottom side 15 would be positioned on the spindle as shown in FIG. 7, but then the tether 54 will be extended around the spindle 72 and coupled to the tool 10. This may be accomplished with slots 56 in the handle 50 and the third edge 18 which engage the tether 54. Additional slots 56 on the first 16 and second 17 edges may be used as needed. Bulbous members 58 on the tether 54 abut the handle 50 or panel 12 while the tether 54 is positioned in the slots 56. The bulbous members 58 retain the tether 54 in place and the tether 54 may be comprised of a resiliently stretchable material.

A horizontal level 60 is mounted on the panel 12 and indicates when the first edge 16 is horizontally orientated. A vertical level 61 is mounted on the handle 50 and indicates when the panel 12 is vertically orientated. Together the two levels 60, 61 will ensure that spindles 72, in particular, are orientated correctly.

A magnetic member 64 is attached to the panel 12 to magnetically secure fasteners 32 to the panel 12. This allows a person to position a number of fasteners on the panel 12 and remove them as needed in a manner that is readily organized and easy to grip.

Figure 8:
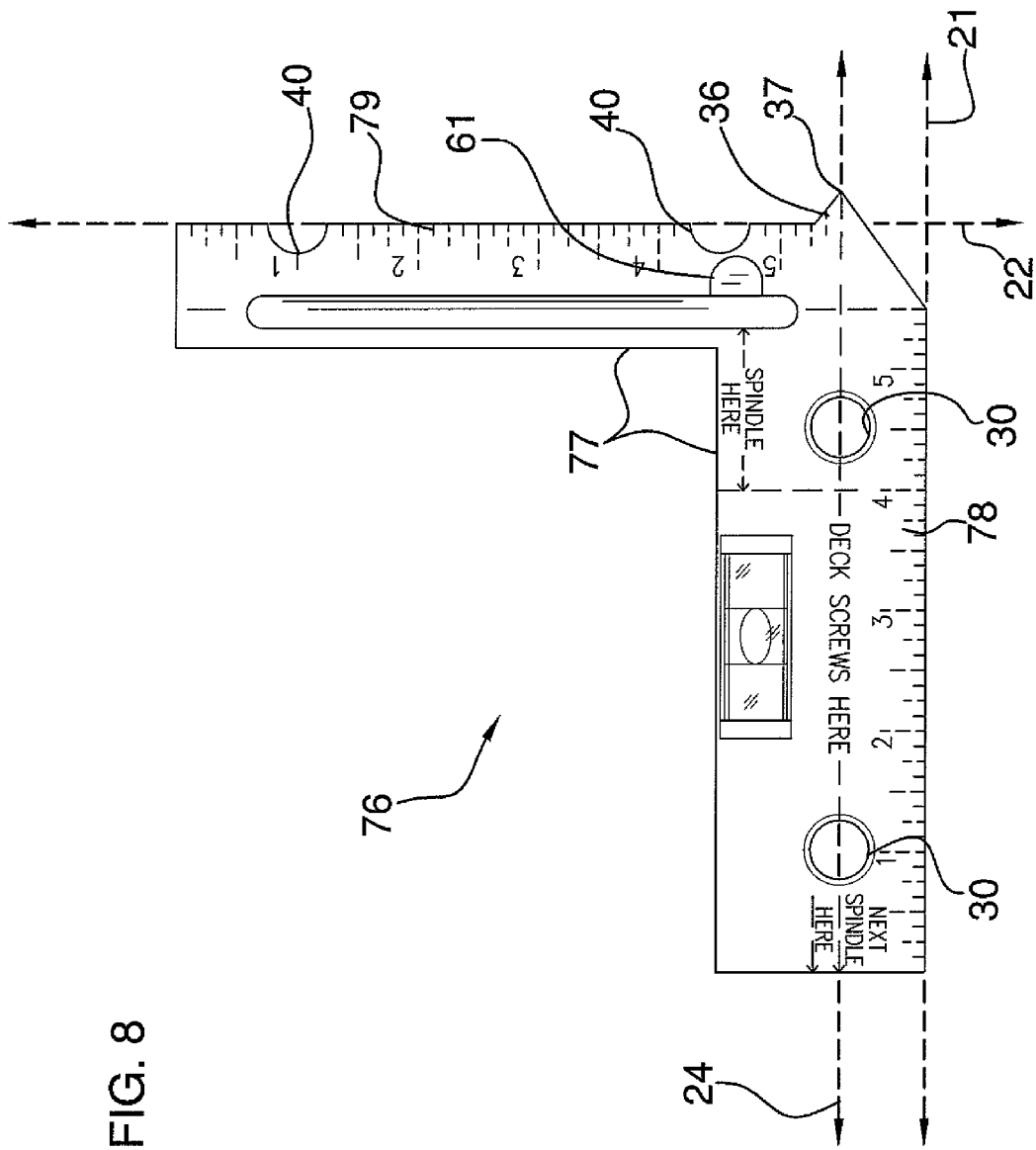
FIG. 8 is a top view of an embodiment of the disclosure.

FIG. 8 depicts an embodiment of the tool 76 which is L-shaped to allow the tool 76. This embodiment allows for measuring and marking 90° angles. The tool 76 includes a third edge 77 being formed of two sections 78 and 79 orientated perpendicular to each other.

In use, the tool 10 is used as described above and as shown in the Figures. Additionally, the third edge 18 may be used for correctly marking the angle for cutting two end pieces which require a 45 degree angle. One instance where this is needed is the top railing of the deck walls, above the spindles, where two walls come together, though there are multiple needs for such a cut.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A deck building assist tool assembly to indicate to a person the proper placement of decking materials, said assembly including:
    a panel having a top side, a bottom side, a first edge, a second edge, and a third edge, a first line being coextensive with said first edge, a second line being coextensive with said second edge, a third line being coextensive with said third edge, said first and second lines intersecting each other and being orientated perpendicular with respect to each other, said third line intersecting each of said first and second lines and forming a 45 degree angle with each of said first and second lines;
    a spacing plate extending downwardly from said bottom side, said spacing plate lying in a plane orientated perpendicular to a plane of said bottom side, said plane of said spacing plate being orientated parallel to said second line and being positionable between adjacent planks to indicate correct spacing between the adjacent planks;
    said panel having a pair of openings therein extending into said top side and outwardly of said bottom side to indicate correct positioning of fasteners through the plank and into a joist;
    said spacing plate having a front edge directed forward and spaced from said first edge, said front edge being spaced from said first edge to correctly position said openings over a joist;
    said front edge being between 1 inch and 2 inches from said first edge; and
    said openings being centered on a fourth line orientated parallel to said first line, said fourth line lying in a plane orientated perpendicular to said top side and being spaced from said front edge approximately ¾ inch; and
    a pointer being attached to and extending away from said second edge, said fourth line intersecting a point of said pointer to indicate a correct position of a fastener.

2. The assembly according to claim 1, wherein said spacing plate has a first side, a second side and a thickness dimension defined from said first side to said second side, said thickness dimension being from ⅛ inch to 3/16 inch.

3. The assembly according to claim 1, wherein an axis of said openings is spaced from each other 3½ inches.

4. The assembly according to claim 3, wherein a distance between said point and the axis of a closer one of said openings is from 1¾ inches to 2¾ inches.

5. The assembly according to claim 1, wherein said second edge is spaced from said spacing plate to indicate a proper distance between said second edge and a joist, said second edge having notches therein to indicate proper placement of fasteners.

6. The assembly according to claim 5, wherein said notches are spaced from each other 3½ inches and said second edge is spaced ¾ inch from said spacing plate.

7. The assembly according to claim 1, wherein said first edge has a length from a plane of said spacing plate to an edge distal to said second edge from 4½ inches to 5½ inches to indicate a proper space between spindles.

8. The assembly according to claim 1, further including a handle extending upwardly from said top side, said handle having an aperture extending therethrough.

9. The assembly according to claim 8, further including a vertical level being mounted on said handle and indicating when said panel is vertically orientated.

10. The assembly according to claim 1, further including a horizontal level being mounted on said panel and indicating when said first edge is horizontally orientated.

11. The assembly according to claim 1, further including a magnetic member being attached to said panel to magnetically secure fasteners to said panel.

12. A deck building assist tool assembly to indicate to a person the proper placement of decking materials, said assembly including:
   a panel having a top side, a bottom side, a first edge, a second edge, and a third edge, a first line being coextensive with said first edge, a second line being coextensive with said second edge, a third line being coextensive with said third edge, said first and second lines intersecting each other and being orientated perpendicular with respect to each other, said third line intersecting each of said first and second lines and forming a 45 degree angle with each of said first and second lines;
   a spacing plate extending downwardly from said bottom side, said spacing plate lying in a plane orientated perpendicular to a plane of said bottom side, said plane of said spacing plate being orientated parallel to said second line and being positionable between adjacent planks to indicate correct spacing between the adjacent planks, said spacing plate having a first side, a second side and a thickness dimension defined from said first side to said second side, said thickness dimension being from ⅛ inch to 3/16 inch;
   said panel having a pair of openings therein extending into said top side and outwardly of said bottom side to indicate correct positioning of fasteners through the plank and into a joist;
   said spacing plate having a front edge directed forward and spaced from said first edge, said front edge being spaced from said first edge to correctly position said openings over a joist, said front edge being between 1 inch and 2 inches from said first edge;
   said openings being centered on a fourth line orientated parallel to said first line, said fourth line lying in a plane orientated perpendicular to said top side and being spaced from said front edge approximately ¾ inch, an axis of said openings being spaced from each other 3½ inches, a pointer being attached to and extending away from said second edge, said fourth line intersecting a point of said pointer, a distance between said point and the axis of a closer one of said openings being from 1¾ inches to 2¼ inches;
   said second edge being spaced from said spacing plate to indicate a proper distance between said second edge and a joist, said second edge having notches therein to indicate proper placement of fasteners, said notches being spaced from each other 3½ inches, said second edge being spaced ¾ inch from said spacing plate;
   said first edge having a length from a plane of said spacing plate to an edge distal to said second edge from 4½ inches to 5½ inches to indicate a proper space between spindles;
   a handle extending upwardly from said top side, said handle having an aperture extending therethrough;
   a horizontal level being mounted on said panel and indicating when said first edge is horizontally orientated;
   a vertical level being mounted on said handle and indicating when said panel is vertically orientated; and
   a magnetic member being attached to said panel to magnetically secure fasteners to said panel.

13. A deck building assist tool assembly to indicate to a person the proper placement of decking materials, said assembly including:
   a panel having a top side, a bottom side, a first edge and a second edge, said panel being L-shaped and said first and second edges defining outside edges of said panel, a first line being coextensive with said first edge and a second line being coextensive with said second edge, said first and second lines intersecting each other and being orientated perpendicular with respect to each other;
   a spacing plate extending downwardly from said bottom side, said spacing plate lying in a plane orientated perpendicular to a plane of said bottom side, said plane of said spacing plate being orientated parallel to said second line and being positionable between adjacent planks to indicate correct spacing between the adjacent planks;
   said panel having a pair of openings therein extending into said top side and outwardly of said bottom side to indicate correct positioning of fasteners through the plank and into a joist;
   said spacing plate having a front edge directed forward and spaced from said first edge, said front edge being spaced from said first edge to correctly position said openings over a joist, said second edge being spaced from said spacing plate to indicate a proper distance between said second edge and a joist, said second edge having notches therein to indicate proper placement of fasteners.

14. The assembly according to claim 13, wherein said spacing plate has a first side, a second side and a thickness dimension defined from said first side to said second side, said thickness dimension being from ⅛ inch to 3/16 inch.

15. The assembly according to claim 13, wherein:
   said front edge being between 1 inch and 2 inches from said first edge; and
   said openings being centered on a fourth line orientated parallel to said first line, said fourth line lying in a plane orientated perpendicular to said top side and being spaced from said front edge approximately ¾ inch.

16. The assembly according to claim 15, wherein an axis of said openings is spaced from each other 3½ inches.

17. The assembly according to claim 16, further including a pointer being attached to and extending away from said second edge, said fourth line intersecting a point of said pointer to indicate a correct position of a fastener, a distance between said point and the axis of a closer one of said openings is from 1¾ inches to 2¼ inches.

18. The assembly according to claim 13, further including;
   a handle extending upwardly from said top side;
   a horizontal level being mounted on said panel and indicating when said first edge is horizontally orientated; and
   a vertical level being mounted on said handle and indicating when said panel is vertically orientated.

* * * * *